US012802630B2

(12) United States Patent
Li et al.

(10) Patent No.: US 12,802,630 B2
(45) Date of Patent: Nov. 17, 2026

(54) DISPLAY PANEL, METHOD FOR DRIVING DISPLAY PANEL AND DISPLAY DEVICE

(71) Applicant: HKC CORPORATION LIMITED, Shenzhen (CN)

(72) Inventors: Jianlei Li, Shenzhen (CN); Lidan Ye, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/318,698

(22) Filed: Sep. 4, 2025

(65) Prior Publication Data

US 2026/0087973 A1 Mar. 26, 2026

(30) Foreign Application Priority Data

Sep. 26, 2024 (CN) ......................... 202411349283.0

(51) Int. Cl.
*G09G 3/32* (2016.01)
*G09G 3/3216* (2016.01)

(52) U.S. Cl.
CPC ............. *G09G 3/32* (2013.01); *G09G 3/3216* (2013.01); *G09G 2310/0267* (2013.01); *G09G 2310/0275* (2013.01); *G09G 2310/08* (2013.01); *G09G 2320/064* (2013.01); *G09G 2330/021* (2013.01)

(58) Field of Classification Search
CPC ............. G09G 3/32; G09G 2310/0267; G09G 2310/0275; G09G 2310/08; G09G 2320/064; G09G 2330/021; G09G 3/3216
See application file for complete search history.

(56) References Cited

U.S. PATENT DOCUMENTS

| | | | | |
|---|---|---|---|---|
| 2004/0263437 A1* | 12/2004 | Hattori | G09G 3/3216 | 345/76 |
| 2012/0098874 A1* | 4/2012 | Kubota | G09G 3/3258 | 315/228 |
| 2020/0124914 A1* | 4/2020 | den Boer | G09G 3/3614 | |

FOREIGN PATENT DOCUMENTS

| | | | |
|---|---|---|---|
| CN | 101276543 | A | 10/2008 |
| CN | 117275393 | A | 12/2023 |
| CN | 220420231 | U | 1/2024 |
| CN | 117663023 | A | 3/2024 |
| JP | 2012128172 | A | 7/2012 |

OTHER PUBLICATIONS

Notification to Grant Patent Right for Invention issued in counterpart Chinese Patent Application No. 202411349283.0, dated Oct. 31, 2024.

* cited by examiner

*Primary Examiner* — Patrick N Edouard
*Assistant Examiner* — Joseph P Fox
(74) *Attorney, Agent, or Firm* — Westbridge IP LLC

(57) ABSTRACT

A display panel includes a data line driver chip and a plurality of pixel units. Each of the pixel units includes: a first light emitting diode and a second light emitting diode. The data line driver chip is connected to a cathode of each of the first light emitting diodes and an anode of each of the second light emitting diodes through a data line. In a same pixel unit, an anode of the first light emitting diode is connected to odd-row scanning lines, the cathode of the first light emitting diode is connected to the anode of the second light emitting diode, and a cathode of the second light emitting diode is connected to even-row scanning lines.

10 Claims, 5 Drawing Sheets

DISPLAY PANEL, METHOD FOR DRIVING DISPLAY PANEL AND DISPLAY DEVICE

CROSS-REFERENCE TO RELATED APPLICATIONS

This application claims priority to Chinese Patent Application No. 202411349283.0, filed on Sep. 26, 2024, the content of which is incorporated herein by reference in its entirety.

TECHNICAL FIELD

The present application relates to the technical field of display, and in particular to a display panel, a method for driving a display panel and a display device.

BACKGROUND

Sub-millimeter-level light emitting diodes or micro-light emitting diodes adopt a passive matrix (PM) driving architecture. At present, in the existing PM driving architecture, the driver chip outputs a pulse width modulation (PWM) data control signal to the cathode of the LED through a data line. When the anode of the LED is at a high level, in the low level duration of the PWM data control signal, the LED is forward-conducted and the LED is driven to light up. In the high level duration of the PWM data control signal, the light emitting diode stops conducting, that is, it is extinguished. Therefore, in the above PM driving architecture, the PWM data control signal needs to switch between high and low levels when each row of light emitting diodes is lit.

However, in the above PM driving architecture, the PWM data control signal switches between high and low levels once, and only the light emitting diodes on one row of scanning lines are lit. Therefore, when the refresh rate is high, the frequency of switching between high and low levels for controlling the light emitting diodes to turn on or off will be higher, resulting in a large amount of additional power consumption caused by the parasitic capacitance on the data line.

SUMMARY

The present application is to provide a display panel, a method for driving a display panel and a display device, aiming to solve the technical problem in the related art that when the refresh rate is high, the frequency of switching between the high and low levels for controlling the on or off of the light emitting diode will be higher, resulting in a large amount of additional power consumption caused by the parasitic capacitance on the data line.

To achieve the above object, the present application provides a display panel, including:

- a data line driver chip; and
- a plurality of pixel units;
- each of the pixel units includes: a first light emitting diode and a second light emitting diode;
- the data line driver chip is connected to a cathode of each of the first light emitting diodes and an anode of each of the second light emitting diodes through a data line;
- in a same pixel unit, an anode of the first light emitting diode is connected to odd-row scanning lines, the cathode of the first light emitting diode is connected to the anode of the second light emitting diode, and a cathode of the second light emitting diode is connected to even-row scanning lines;

- the data line driver chip is configured to output a same pulse width modulation (PWM) data control signal to the first light emitting diode and the second light emitting diode through the data line;
- the data line driver chip is further configured to drive the first light emitting diode in a low level duration of the PWM data control signal; and
- the data line driver chip is further configured to drive the second light emitting diode during a high level duration of the PWM data control signal.

In an embodiment, further including a scanning line driver chip,

- the scanning line driver chip is connected to the anode of each of the first light emitting diodes and the cathode of each of the second light emitting diodes through scanning lines;
- the scanning line driver chip is configured to output a first PWM scanning control signal to each of the first light emitting diodes through the scanning lines, and output a second PWM scanning control signal to each of the second light emitting diodes through the scanning lines;
- the data line driver chip is configured to drive the first light emitting diode based on the first PWM scanning control signal in the low level duration of the PWM data control signal; and
- the data line driver chip is further configured to drive the second light emitting diode based on the second PWM scanning control signal in the high level duration of the PWM data control signal.

In an embodiment, the scanning line driver chip is connected to the anode of each of the first light emitting diodes through the odd-row scanning lines, and the scanning line driver chip is connected to the cathode of each of the second light emitting diodes through the even-row scanning lines;

- the scanning line driver chip is further configured to output the first PWM scanning control signal to the anode of each of the first light emitting diodes through the odd-row scanning lines; and
- the data line driver chip is further configured to drive the first light emitting diode when the first PWM scanning control signal is in a high level state in the low level duration of the PWM data control signal.

In an embodiment, the data line driver chip is further configured to stop driving the first light emitting diode when the first PWM scanning control signal is in a low level state in the low level duration of the PWM data control signal.

In an embodiment, the data line driver chip is further configured to control a gray scale of the first light emitting diode by adjusting a light emitting duration of the first light emitting diode; and

- the light emitting duration of the first light emitting diode is a time difference between a low-level ending moment of the PWM data control signal and a high-level starting moment of the first PWM scanning control signal.

In an embodiment, the scanning line driver chip is further configured to output the second PWM scanning control signal to the cathode of each second light emitting diode through the even-row scanning lines; and

- the data line driver chip is further configured to drive the second light emitting diode when the second PWM scanning control signal is in a low level state in the high level duration of the PWM data control signal.

In an embodiment, the data line driver chip is further configured to stop driving the second light emitting diode when the second PWM scanning control signal is in a high level state in the high level duration of the PWM data control signal.

In an embodiment, the data line driver chip is further configured to control a gray scale of the second light emitting diode by adjusting a light emitting duration of the second light emitting diode; and the light emitting duration of the second light emitting diode is a time difference between a high-level ending moment of the PWM data control signal and a low-level starting moment of the second PWM scanning control signal.

In addition, to achieve the above-mentioned purpose, the present application also proposes a method based on the display panel described above, the method for driving the display panel including:

outputting the same PWM data control signal to the first light emitting diode and the second light emitting diode through the data line;

in the low level duration of the PWM data control signal, driving the first light emitting diode; and in the high level duration of the PWM data control signal, driving the second light emitting diode.

In addition, to achieve the above-mentioned purpose, the present application also proposes a display device, the display device includes the display panel described above.

One or more technical solutions proposed in the present application have at least the following technical effects.

The display panel of the present application includes: a data line driver chip and a plurality of pixel units; each of the pixel units includes: a first light emitting diode and a second light emitting diode; the data line driver chip is connected to the cathode of each of the first light emitting diodes and the anode of each of the second light emitting diode through a data line; in the same pixel unit, the anode of the first light emitting diode is connected to the odd-row scanning lines, the cathode of the first light emitting diode is connected to the anode of the second light emitting diode, and the cathode of the second light emitting diode is connected to the even-row scanning lines.

The data line driver chip of the present application outputs the same PWM data control signal to the first light emitting diode and the second light emitting diode through the data line. Since the data line driver chip drives the first light emitting diode in the low level duration of the PWM data control signal and drives the second light emitting diode in the high level duration of the PWM data control signal, the present application can light up the light emitting diodes on two scanning lines when the PWM data control signal switches between high and low levels, thereby effectively reducing the frequency of switching between the high and low levels of controlling the light emitting diodes to turn on or off when the refresh rate is high, and avoiding a large amount of additional power consumption caused by the parasitic capacitance on the data line.

BRIEF DESCRIPTION OF THE DRAWINGS

The accompanying drawings, which are incorporated in and constitute a part of this specification, illustrate embodiments consistent with the present application and, together with the description, serve to explain the principles of the present application.

In order to more clearly illustrate the embodiments of the present application or the technical solutions in the related art, the drawings required for use in the embodiments or the description of the related art will be briefly introduced below. Obviously, the drawings described below are only some embodiments of the present application. For those skilled in the art other drawings can be obtained based on the structures shown in these drawings without creative work.

The purpose, features and advantages of the present application will be further described in conjunction with the embodiments and with reference to the accompanying drawings.

DETAILED DESCRIPTION OF THE EMBODIMENTS

It should be understood that the specific embodiments described herein are only used to explain the technical solutions of the present application and are not used to limit the present application.

In order to better understand the technical solution of the present application, a detailed description will be given below in conjunction with the accompanying drawings and specific implementation methods.

The main solution of the embodiment of the present application is: the data line driver chip is connected to the cathode of each first light emitting diode and the anode of each second light emitting diode through the data line; in the same pixel unit, the anode of the first light emitting diode is connected to the odd-row scanning line, the cathode of the first light emitting diode is connected to the anode of the second light emitting diode, and the cathode of the second light emitting diode is connected to the even-row scanning line. The data line driver chip of the present application outputs the same pulse width modulation (PWM) data control signal to the first light emitting diode and the second light emitting diode through the data line, drives the first light emitting diode in the low level duration of the PWM data control signal, and drives the second light emitting diode in the high level duration of the PWM data control signal.

Figure 1:
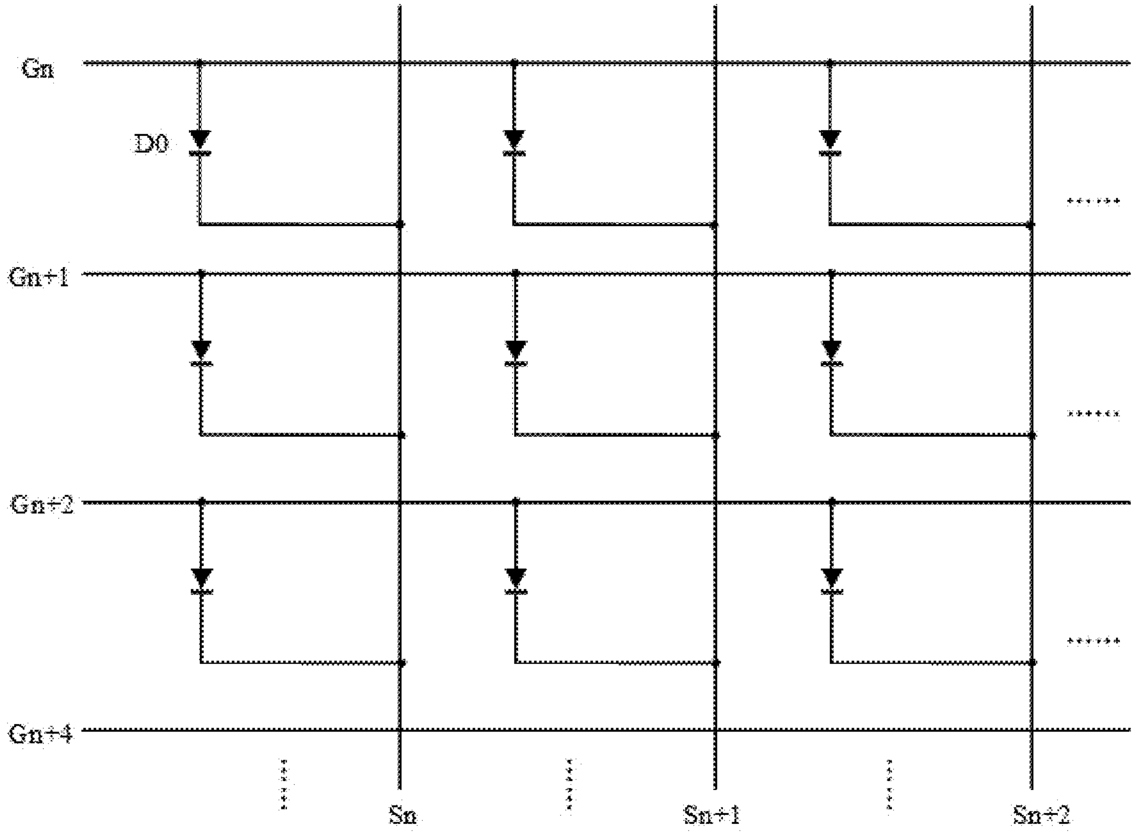
FIG. 1 (Prior art)
FIG. 1 is a schematic diagram of an existing passive matrix (PM) driving architecture.

FIG. 1 is a schematic diagram of an existing passive matrix (PM) driving architecture. As shown in FIG. 1, the driver chip outputs a PWM signal to the anode of the light emitting diode D0 in each pixel unit through each scanning line such as scanning line Gn, scanning line Gn+1, scanning line Gn+2, scanning line Gn+3, and the driver chip outputs another PWM signal to the cathode of the light emitting diode D0 in each pixel unit through each data line such as data line Sn, data line Sn+1, data line Sn+2. Any light emitting diode D0 is forward-conducted and lit when the PWM signal received by the anode is at a high level and the PWM signal received by the cathode is at a low level.

Figure 2:
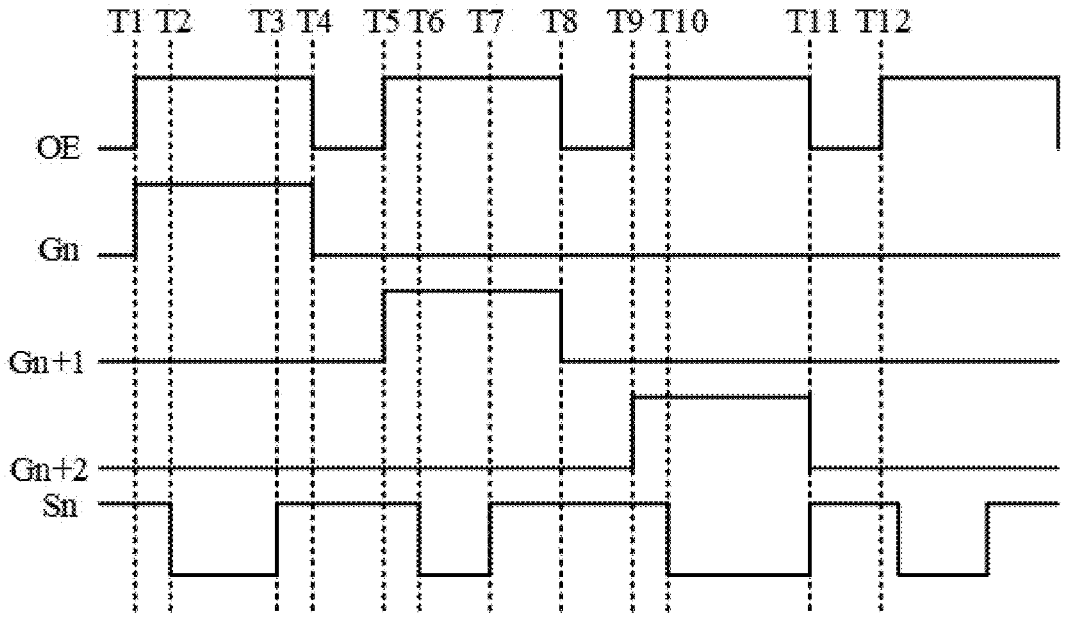
FIG. 2 (Prior art)
FIG. 2 is a schematic diagram of a driving timing sequence of the existing PM driving architecture.

Further, as shown in FIG. 2, which is a schematic diagram of a driving timing sequence of the existing PM driving architecture. T1-T12 are moments, OE is the enable output of the PWM signal on the scanning line Gn, and for the light emitting diode D0 on the scanning line Gn, when the PWM scanning control signal in the scanning line Gn is in a high-level state and the PW signal in the data line Sn is in a low-level state, the light emitting diode D0 is forward-conducted and lit, and the brightness can be adjusted by controlling the light-emitting duration of the light emitting diode D0.

Specifically, for the light emitting diode D0 connected to the scanning line Gn, during the period from T1 to T4, the PWM signal on the scanning line Gn is at a high level, and the PWM signal on the data line Sn is at a low level during the period from T2 to C. Therefore, the light emitting diode D0 is forward-conducted and lit during the period from T2 to T2. T2 is the starting moment of light emission, T3 is the ending moment of light emission, and at T4, the PWM signal on the scanning line Gn is at a low level, and the scanning line Gn is closed. For the light emitting diode D0 connected to the scanning line Gn+1, during the period from T5 to T8, the PWM signal on the scanning line Gn+1 is at a high level, and the PWM signal on the data line Sn is at a low level during the period from T6 to T7, so the light emitting diode D0 is forward-conducted and lit during the period from T6 to T7. T6 is the starting moment of light emission, T7 is the ending moment of light emission, at T8 the PWM signal on the scanning line Gn+1 is at a low level, and the scanning line Gn+1 is closed, and so on, for the light emitting diodes D0 on other scanning lines and subsequent moments, the above description can be referred to, and the embodiment will not be repeated. The positions of the above-mentioned moments T2 and T6 are periodically constant, and the positions of the moments T1 and T4 are also periodically constant, and the time difference between T2 and T1 is equal to the time difference between T6 and T5, so the actual determination of the light emission duration is the phase difference between T2 to T3 and T6 to T7, and the brightness can be adjusted by controlling the phase difference.

Under the above-mentioned existing PM driving mode, the PWM data control signal switches between high and low levels once, and only the light emitting diodes D0 on one row of scanning lines are lit. The dimming mode that adjusts the light-emitting brightness by controlling the light-emitting duration of the light emitting diode D0 generally has a high refresh rate. When the refresh rate is high, the frequency of switching between high and low levels that controls the light emitting diode D0 on or off will be higher. Since there is parasitic capacitance on the data line, the parasitic capacitance will be continuously charged and discharged. When the frequency of switching between high and low levels is high, the number of times the parasitic capacitance is charged and discharged will also increase accordingly, resulting in a large amount of additional power consumption.

The present application provides a solution, in which two light emitting diodes, namely a first light emitting diode and a second light emitting diode, are provided in a pixel unit; a data line driver chip is connected to the cathode of each first light emitting diode and the anode of each second light emitting diode through a data line; in the same pixel unit, the anode of the first light emitting diode is connected to the odd-row scanning line, the cathode of the first light emitting diode is connected to the anode of the second light emitting diode, and the cathode of the second light emitting diode is connected to the even-row scanning line. The data line driver chip of the present application drives the first light emitting diode in the low level duration of the PWM data control signal, and drives the second light emitting diode in the high level duration of the PWM data control signal. Therefore, the present application can light up the light emitting diodes on two scanning lines when the PWM data control signal switches between high and low levels, thereby effectively reducing the frequency of switching between high and low levels of controlling the light emitting diodes to turn on or off when the refresh rate is high, thereby reducing the number of times the parasitic capacitance is charged and discharged, and avoiding a large amount of additional power consumption caused by the parasitic capacitance on the data line.

Figure 3:
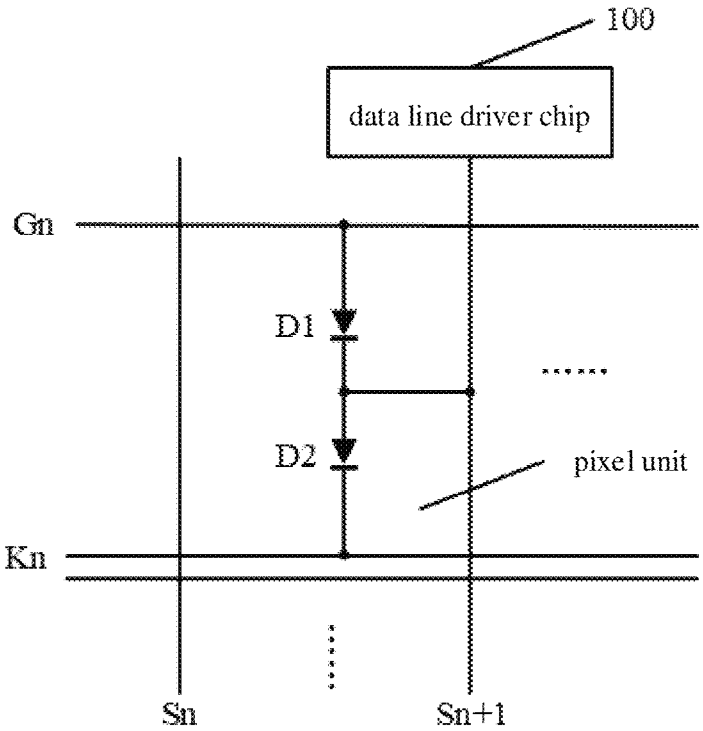
FIG. 3 is a structural schematic diagram of a display panel according to a first embodiment of the present application.

Based on this, an embodiment of the present application provides a display panel. As shown in FIG. 3, FIG. 3 is a structural schematic diagram of a display panel according to a first embodiment of the present application.

In the embodiment, the display panel includes: a data line driver chip 100 and a plurality of pixel units.

Each of the pixel units includes a first light emitting diode D1 and a second light emitting diode D2.

The data line driver chip 100 is connected to the cathode of each of the first light emitting diode D1 and the anode of each of the second light emitting diode D2 through the data line.

It should be noted that the above pixel unit can be a grid formed by the intersection of mutually perpendicular scanning lines and data lines. As shown in FIG. 1, scanning lines Gn, scanning lines Gn+1 and data lines Sn, data lines Sn+1 intersect, and the grid area surrounded by the four intersections can form a pixel unit.

The data line driver chip 100 is connected to the anode of each of the first light emitting diodes D1 and the cathode of each of the second light emitting diodes D2 through data lines.

It should be noted that the data line driver chip 100 may be a chip connected to each data line and outputting a PWM data control signal through the data line. The PWM data control signal may be a control signal providing a high or low level to the light emitting diode.

The pixel unit shown in FIG. 3 can be any one of the pixel units, and the light emitting diodes and their connections inside each pixel unit are consistent with the pixel unit shown in FIG. 3, which will not be repeated here. As shown in FIG. 3, in the same pixel unit, the anode of the first light emitting diode D1 is connected to the odd-row scanning line, the cathode of the first light emitting diode D1 is connected to the anode of the second light emitting diode D2, and the cathode of the second light emitting diode D2 is connected to the even-row scanning line.

It should be noted that in FIG. 3, the scanning line Gn is an odd-row scanning line, and the scanning lines Kn is an even-row scanning line. For example, the scanning lines may be scanning line 1, scanning line 2, scanning line 3, and scanning line 4 in sequence, then scanning line 1 and scanning line 3 may be odd-row scanning lines, and scanning line 2 and scanning line 4 may be even-row scanning lines.

Figure 4:
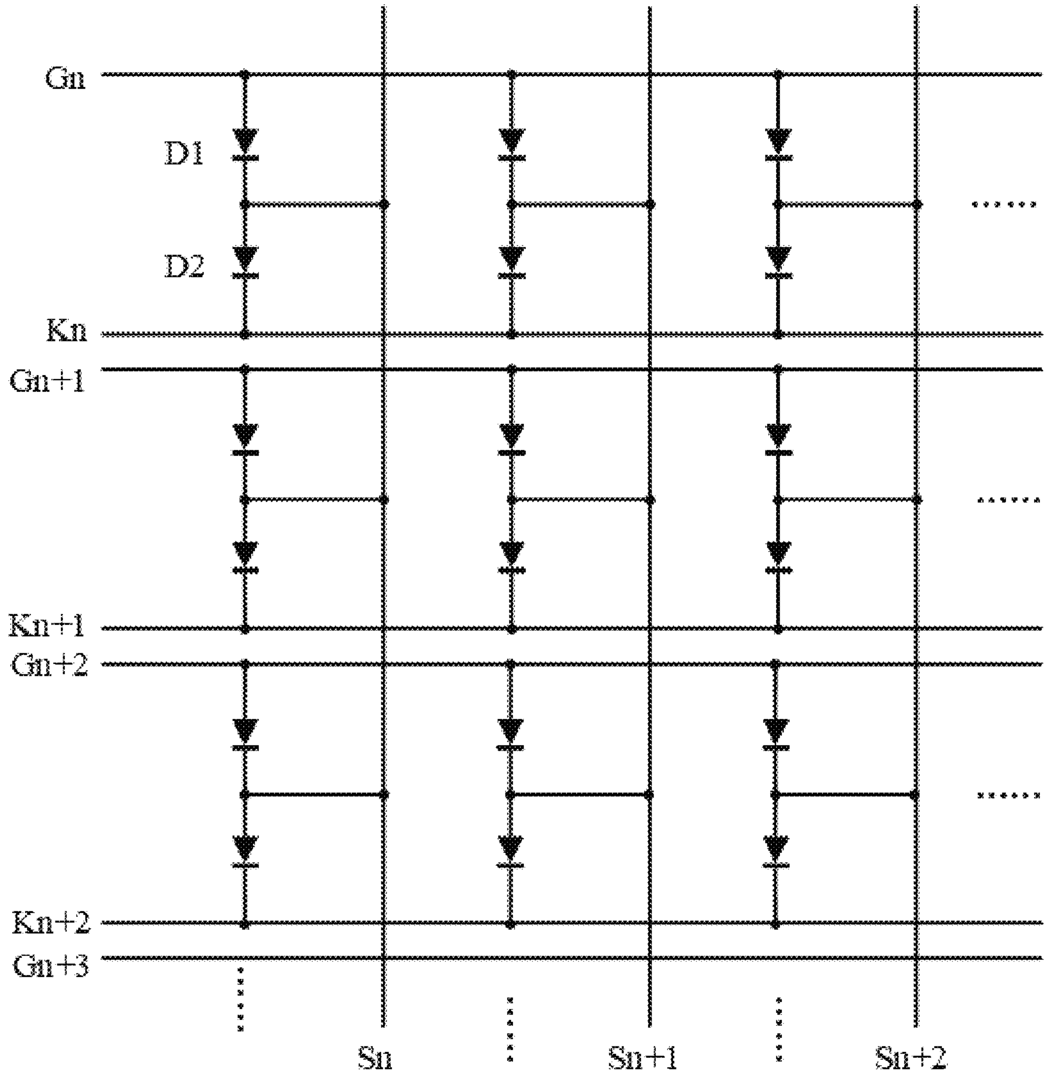
FIG. 4 is a schematic diagram of a driving architecture of the display panel according to a first embodiment of the present application.

For ease of understanding, reference is made to FIG. 4 for explanation, but this solution is not limited. FIG. 4 is a schematic diagram of the driving architecture of the display panel according to a first embodiment of the present application. As shown in FIG. 4, the rows of scanning lines are scanning line Gn, scanning line Kn, scanning line Gn+1, scanning line Kn+1, scanning line Gn+2, scanning line Kn+2, scanning line Gn+3, . . . in sequence. Scanning line Gn, scanning line Gn+1, and scanning line Gn+2 are all odd-row scanning lines, and scanning line Kn, scanning line Kn+1, and scanning line Kn+2 are all even-row scanning lines. Each scanning line and each data line such as data line Sn, data line Sn+1, and data line Sn+2 intersect with each other to form a plurality of pixel units. Each pixel unit includes a first light emitting diode D1 and a second light emitting diode D2, and the anode of the first light emitting diode D1 in each pixel unit is connected to the odd-row scanning line, and the cathode of the second light emitting diode D2 in each pixel unit is connected to the even-row scanning line.

The data line driver chip 100 is configured to output the same PWM data control signal to the first light emitting diode D1 and the second light emitting diode D2 through the data line.

It should be noted that the data line driver chip 100 can output the same PWM data control signal to the pixel units of each row scanning line through each data line such as the data line Sn, the data line Sn+1, the data line Sn+2, etc. Specifically, in the same pixel unit, the cathode of the first light emitting diode D1 receives the PWM data control signal output by the data line driver chip 100 through the data line, and the anode of the second light emitting diode D2 receives the PWM data control signal output by the data line driver chip 100 through the data line.

The data line driver chip 100 is further configured to drive the first light emitting diode D1 in the low level duration of the PWM data control signal.

The data line driver chip 100 is further configured to drive the second light emitting diode D2 in the high level duration of the PWM data control signal.

In an embodiment, one cycle of the above-mentioned PWM data control signal includes a low level duration and a high level duration. In the low level duration of the PWM data control signal, the signal is in a low level state, and in the high level duration of the PWM data control signal, the signal is in a high level state. In the low level duration of the PWM data control signal, the cathode of the first light emitting diode D1 is in a low level state. When the anode of the first light emitting diode D1 receives a high level signal, the data line driver chip 100 can drive the first light emitting diode D1 to be conduct-forward and light up. In the high level duration of the PWM data control signal, the anode of the second light emitting diode D2 is in a high level state. When the cathode of the second light emitting diode D2 receives a low level signal, the data line driver chip 100 can drive the second light emitting diode D2 to be forward-conducted and light up, so that the first light emitting diode D1 and the second light emitting diode D2 can be lit within one cycle of the PWM data control signal, that is, lighting the first light emitting diode D1 and the second light emitting diode D2 only requires the PWM data control signal to switch between high and low levels once, which effectively reduces the frequency of switching between the high and low levels, reduces the number of times the parasitic capacitance is charged and discharged, and can also reduce the delay caused by the charging and discharging of the parasitic capacitance, which is more conducive to the design of a large-size screen based on PM drive, and after the delay is reduced, each row of the scanning line can have more time for emitting light, which effectively improves the display effect.

The present application includes: a data line driver chip and a plurality of pixel units; each of the pixel units includes: a first light emitting diode and a second light emitting diode; the data line driver chip is connected to the cathode of each of the first light emitting diodes and the anode of each of the second light emitting diode through a data line; in the same pixel unit, the anode of the first light emitting diode is connected to the odd-row scanning lines, the cathode of the first light emitting diode is connected to the anode of the second light emitting diode, and the cathode of the second light emitting diode is connected to the even-row scanning lines. The data line driver chip of the present application outputs the same PWM data control signal to the first light emitting diode and the second light emitting diode through the data line. Since the data line driver chip drives the first light emitting diode in the low level duration of the PWM data control signal and drives the second light emitting diode in the high level duration of the PWM data control signal, the present application can light up the light emitting diodes on two scanning lines when the PWM data control signal switches between high and low levels, thereby effectively reducing the frequency of switching between the high and low levels of controlling the light emitting diodes to turn on or off when the refresh rate is high, and avoiding a large amount of additional power consumption caused by the parasitic capacitance on the data line.

Figure 5:
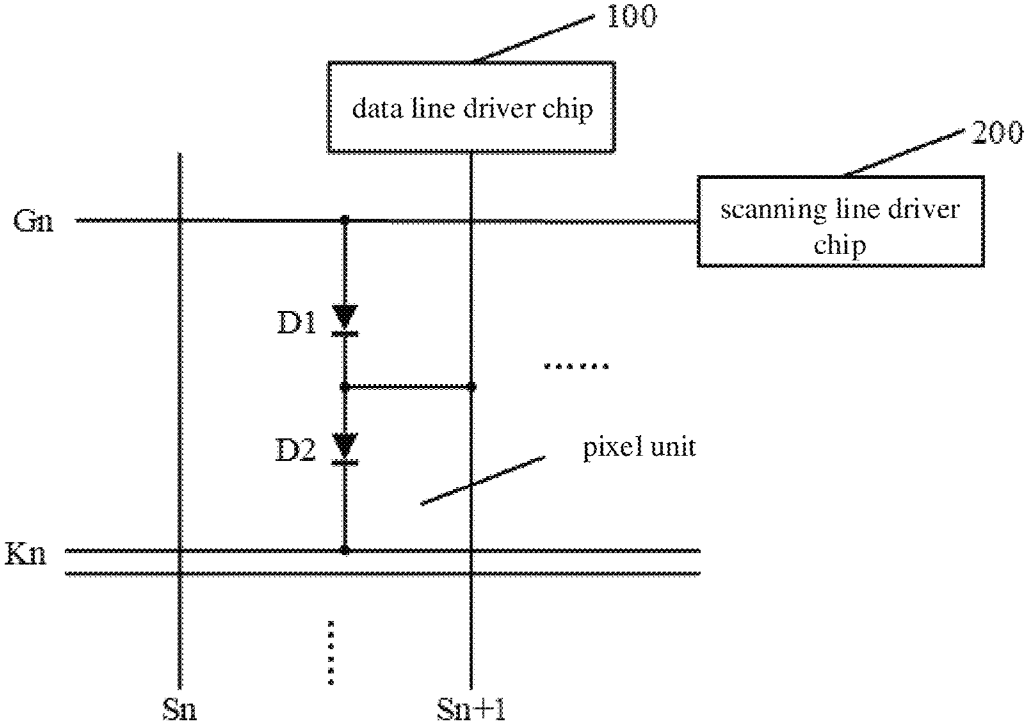
FIG. 5 is a structural schematic diagram of the display panel according to a second embodiment of the present application.

Based on the first embodiment of the present application, the second embodiment of the present application is proposed. In the second embodiment of the present application, the same or similar contents as those of the first embodiment can be referred to the above description, and will not be repeated in the following. On this basis, as shown in FIG. 5, which is a structural schematic diagram of the display panel according to a second embodiment of the present application.

In the embodiment, the display panel further includes: a scanning line driver chip 200.

The scanning line driver chip 200 is connected to the anode of each of the first light emitting diodes D1 and the cathode of each of the second light emitting diodes D2 through scanning lines.

Specifically, the scanning line driver chip 200 can be connected to the anode of each first light emitting diode D1 through odd-row scanning lines such as scanning line Gn, scanning line Gn+1, scanning line Gn+2, and scanning line Gn+3, and the scanning line driver chip 200 can be connected to the cathode of each second light emitting diode D2 through even-row scanning lines such as scanning line Kn, scanning line Kn+1, and scanning line Kn+2.

The scanning line driver chip 200 is configured to output a first PWM scanning control signal to each of the first light emitting diodes D1 through the scanning lines, and to output a second PWM scanning control signal to each of the second light emitting diodes D2 through the scanning lines.

It should be noted that the above-mentioned scanning line driver chip 200 can be a chip connected to each scanning line and outputs a PWM scanning control signal through the scanning line. The PWM scanning control signal includes a first PWM scanning control signal and a second PWM scanning control signal, the first PWM scanning control signal is configured to provide a high and low level signal for the anode of the first light emitting diode D1, and the second PWM scanning control signal is configured to provide a high and low level signal for the cathode of the second light emitting diode D2.

The data line driver chip 100 is configured to drive the first light emitting diode D1 based on the first PWM scanning control signal in the low level duration of the PWM data control signal.

In an embodiment the data line driver chip 100 can provide the same PWM data control signal to the cathode of the first light emitting diode D1 and the anode of the second light emitting diode D2 through the data line. The scanning line driver chip 200 can output the first PWM scanning control signal to the anode of the first light emitting diode D1 through the scanning line. In the low level duration of the PWM data control signal, the data line driver chip 100 can control the first light emitting diode D1 to be forward-conducted or cut-off according to the high or low level states of the first PWM scanning control signal, and drive the first light emitting diode D1 to light up when the first light emitting diode D1 is forward-conducted.

Furthermore, in the embodiment, the scanning line driver chip 200 is further configured to output the first PWM scanning control signal to the anode of each first light emitting diode D1 through the odd-row scanning lines.

The data line driver chip 100 is further configured to drive the first light emitting diode D1 when the first PWM scanning control signal is in a high level state in the low level duration of the PWM data control signal.

The data line driver chip 100 is further configured to stop driving the first light emitting diode D1 when the first PWM scanning control signal is in a low level state in the low level duration of the PWM data control signal.

In an embodiment, the scanning line driver chip 200 can output the first PWM scanning control signal to the anode of each first light emitting diode D1 through odd-row scanning lines such as scanning line Gn, scanning line Gn+1, scanning line Gn+2, and scanning line Gn+3. In the low level duration of the PWM data control signal, that is, when the cathode of the first light emitting diode D1 is continuously in a low level state, if the first PWM scanning control signal received by the anode of the first light emitting diode D1 is in a high level state, the first light emitting diode D1 is driven to be forward-conducted and lit. If the first PWM scanning control signal received by the anode of the first light emitting diode D1 is in a low level state, the first light emitting diode D1 is cut off, the driving of the first light emitting diode D1 is stopped, and the first light emitting diode D1 is extinguished.

In addition, in the low level duration of the PWM data control signal, since the anode of the second light emitting diode D2 is also in a low level state, the second light emitting diode D2 will not be conducted regardless of whether the cathode of the second light emitting diode D2 is in a high level or a low level. That is, in the low level duration of the PWM data control signal, the second light emitting diode D2 is in a cut-off state, thereby preventing the second light emitting diode D2 from being lit when the first light emitting diode D1 is lit, thereby enabling the light emitting diodes to be lit row by row.

The data line driver chip 100 is further configured to drive the second light emitting diode D2 based on the second PWM scanning control signal in the high level duration of the PWM data control signal.

In an embodiment, the scanning line driver chip 200 can output the second PWM scanning control signal to the cathode of the second light emitting diode D2 through the scanning lines. The data line driver chip 100 can control the second light emitting diode D2 to be forward-conducted or cut-off according to the high or low level states of the second PWM scanning control signal in the high level duration of the PWM data control signal, that is, when it switches from a low level to a high level. When the second light emitting diode D2 is forward-conducted, the second light emitting diode D2 is driven to light up.

The scanning line driver chip 200 is further configured to output the second PWM scanning control signal to the cathode of each second light emitting diode D2 through the even-row scanning lines.

The data line driver chip 100 is further configured to drive the second light emitting diode D2 when the second PWM scanning control signal is in a low level state in the high level duration of the PWM data control signal.

The data line driver chip 100 is further configured to stop driving the second light emitting diode D2 when the second PWM scanning control signal is in a high level state in the high level duration of the PWM data control signal.

In an embodiment, the scanning line driver chip 100 can output the second PWM scanning control signal to the cathode of each second light emitting diode D2 through even-row scanning lines such as scanning line Kn, scanning line Kn+1, and scanning line Kn+2. In the high level duration of the PWM data control signal, that is, when the anode of the second light emitting diode D2 is continuously in a high level state, if the second PWM scanning control signal received by the cathode of the second light emitting diode D2 is in a low level state, the second light emitting diode D2 is driven to be forward-conducted and lit. If the second PWM scanning control signal received by the cathode of the second light emitting diode D2 is in a high level state, the second light emitting diode D2 is cut off, the driving of the second light emitting diode D2 is stopped, and the second light emitting diode D2 is extinguished.

The data line driver chip of the embodiment drives the first light emitting diode based on the first PWM scanning control signal in the low level duration of the PWM data control signal, and drives the second light emitting diode based on the second PWM scanning control signal in the high level duration of the PWM data control signal, thereby being able to realize row-by-row driving of the first light emitting diode and the second light emitting diode by combining the level states of the first PWM scanning control signal, the second PWM scanning control signal and the PWM data control signal, thereby effectively improving the driving accuracy.

Based on the second embodiment of the present application, the third embodiment of the present application is proposed. In the third embodiment of the present application, the same or similar contents as those of the first embodiment and the second embodiment can be referred to the above introduction, and will not be repeated in the following.

In the embodiment, the data line driver chip 100 is further configured to control the gray scale of the first light emitting diode D1 by adjusting the light emitting duration of the first light emitting diode D1.

The light emitting duration of the first light emitting diode D1 is the time difference between the low-level ending moment of the PWM data control signal and the high-level starting moment of the first PWM scanning control signal.

In an embodiment, the first light emitting diode D1 is turned on when the first PWM scanning control signal received by the anode of the first light emitting diode D1 is in a high-level state and the PWM data control signal received by the cathode of the first light emitting diode D1 is in a low-level state (i.e., within the low level duration). Therefore, the time difference between the low-level ending moment of the PWM data control signal and the high-level starting moment of the first PWM scanning control signal is the light emitting duration of the first light emitting diode D1. By controlling the light emitting duration of the first light emitting diode D1, the grayscale of the first light emitting diode D1 can be controlled.

The data line driver chip 100 is further configured to control the gray scale of the second light emitting diode D2 by adjusting the light emitting duration of the second light emitting diode D2.

the second light emitting diode D2 is the time difference between the high-level ending moment of the PWM data control signal and the low-level starting moment of the second PWM scanning control signal.

In an embodiment, the second light emitting diode D2 is conducted when the PWM data control signal received by the anode of the second light emitting diode D2 is in a high-level state (i.e., within the high-level duration) and the second PWM scanning control signal received by the cathode of the second light emitting diode D2 is in a low-level state. Therefore, the time difference between the high-level ending moment of the PWM data control signal and the low-level starting moment of the second PWM scanning control signal is the light emitting duration of the second light emitting diode D2. By controlling the light emitting duration of the second light emitting diode D2, the gray scales of the second light emitting diode D2 can be controlled.

Figure 6:
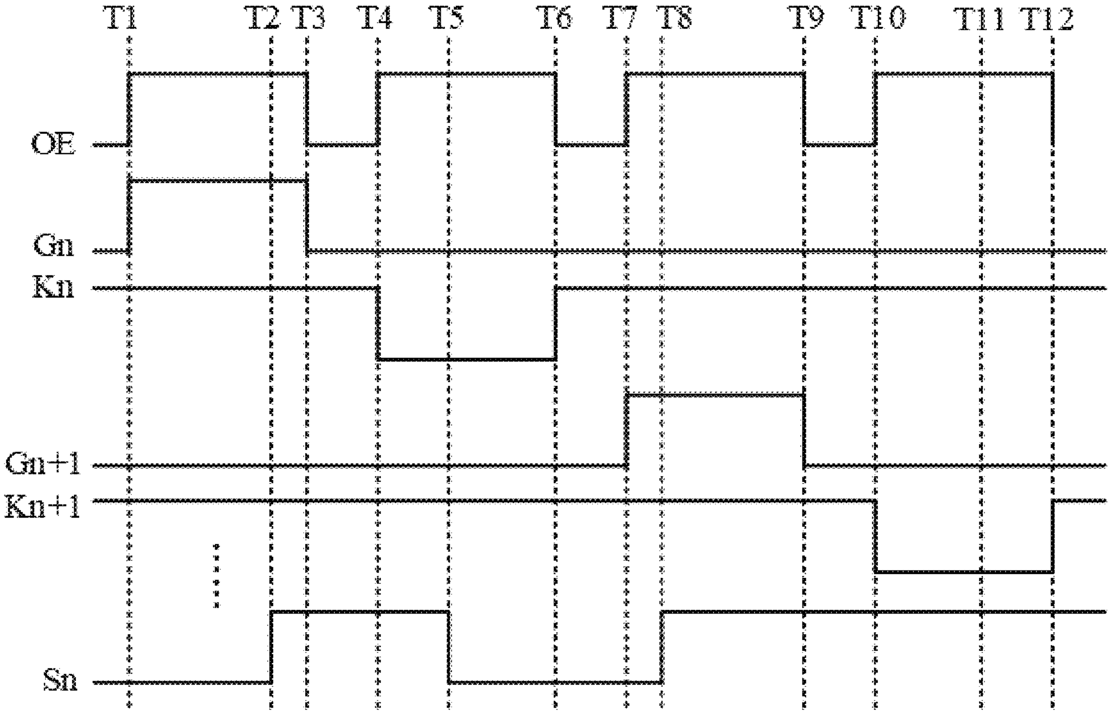
FIG. 6 is a schematic diagram of a driving timing sequence of the display panel according to a third embodiment of the present application.

For ease of understanding, reference is made to FIG. 6 for explanation, but this solution is not limited. FIG. 6 is a schematic diagram of the driving timing sequence of the display panel according to a third embodiment of the present application. As shown in FIG. 6, T1 to T12 are moments, and OE is the enable output of the first PWM scanning control signal and the second PWM scanning control signal on the scanning lines.

As shown in FIG. 4 and FIG. 6, during the period from T1 to T2, the first PWM scanning control signal on the odd-row scanning line Gn is in a high-level state, the PWM data control signal on the data line Sn is in a low-level state, the first light emitting diode D1 connected to the odd-row scanning line Gn is forward-conducted and continuously lit. The first PWM scanning control signal on other odd-row scanning lines (such as the odd-row scanning line Gn+1) is in a low-level state, the first light emitting diode D1 connected to other odd-row scanning lines will not be lit. The second PWM scanning control signal on each even-row scanning line (such as the even-row scanning line Kn and the even-row scanning line Kn+1) is in a high-level state, the second light emitting diode D2 connected to each even-row scanning line is reversely cut off and will not be lit. At moment T2, the PWM data control signal on the data line Sn is switched to a high level, the first light emitting diode D1 connected to the odd-row scanning line Gn stops conducting, and the lighting ends. After moment T3, the first PWM scanning control signal on the odd-row scanning line Gn is switched to a low level, and the driving of the entire row of first light emitting diodes D1 connected to the odd-row scanning line Gn is finished.

During the period from T4 to T5, the second PWM scanning control signal on the even-row scanning line Kn is in a low-level state, the PWM data control signal on the data line Sn is in a high-level state, the second light emitting diode D2 connected to the even-row scanning line Kn is forward-conducted and continuously lit. The second PWM scanning control signal on other even-row scanning lines (such as the even-row scanning line Kn+1) is in a high-level state, the second light emitting diode D2 connected to other even-row scanning lines will not be lit. The first PWM scanning control signal on each odd-row scanning line is in a low-level state, the first light emitting diode D1 connected to each odd-row scanning line is reversely cut off and will not be lit. At moment T5, the PWM data control signal on the data line Sn is switched to a low level, the second light emitting diode D2 connected to the even-row scanning line Kn stops conducting, and the lighting ends. After moment T6, the second PWM scanning control signal on the even-row scanning line Kn is switched to a high level, and the driving of the entire row of second light emitting diodes D2 connected to the even-row scanning line Kn ends.

For the time after T6, the driving timing sequence of the light emitting diodes connected to each scanning line can refer to the above description, which will not be repeated here.

In the embodiment, the high-level starting moment of the first PWM scanning control signal on the scanning line and the low-level starting moment of the second PWM scanning control signal are configured to determine the starting moment of the light emitting diode, and both are periodically fixed. While the switching between the high and low levels of the PWM data control signal on the data line is configured to determine the ending moment of the light emitting diode, which can be changed. The time difference between the stop time and the starting moment is the light emitting duration. Therefore, the light emitting duration of the light emitting diode can be adjusted by adjusting the moment of switching between the high and low levels of the PWM data control signal, thereby achieving accurate control of the gray scales of the light emitting diode.

Figure 7:
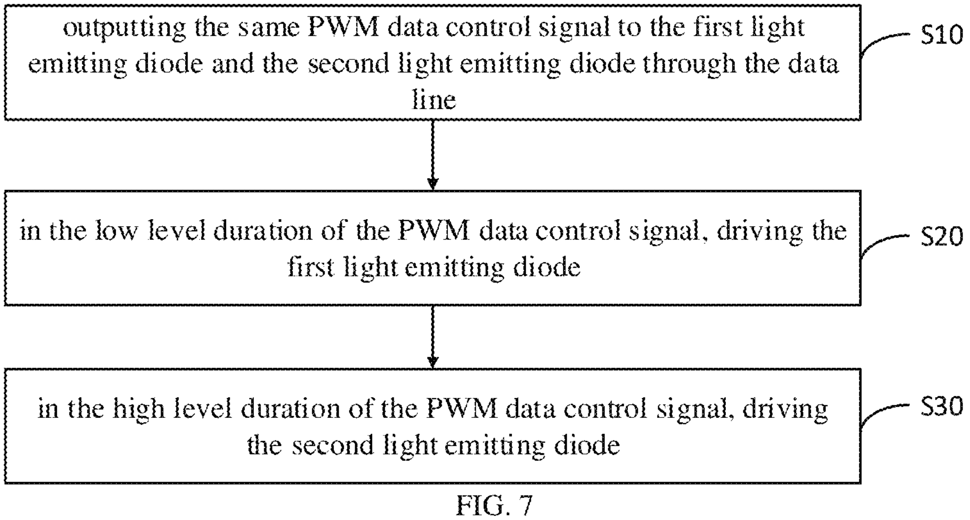
FIG. 7 is a flowchart of a method for driving the display panel according to an embodiment of the present application.

The present application further proposes a method for driving the display panel. As shown in FIG. 7, which is a flowchart of the method for driving the display panel according to an embodiment of the present application.

In the embodiment, the method includes steps S10 to S30:

step S10, outputting the same PWM data control signal to the first light emitting diode and the second light emitting diode through the data line;

step S20, in the low level duration of the PWM data control signal, driving the first light emitting diode; and step S30, in the high level duration of the PWM data control signal, driving the second light emitting diode.

In an embodiment, the execution subject of the method of the embodiment can be a data line driver chip. In the low level duration of the PWM data control signal, the cathode of the first light emitting diode is in a low level state. When the anode of the first light emitting diode receives a high level signal, the data line driver chip can drive the first light emitting diode to conduct forward and light up. In the high level duration of the PWM data control signal, the anode of the second light emitting diode is in a high level state. When the cathode of the second light emitting diode receives a low level signal, the data line driver chip can drive the second light emitting diode to conduct forward and light up, so that the first light emitting diode and the second light emitting diode can be lit within one cycle of the PWM data control signal. That is, lighting the first light emitting diode and the second light emitting diode only requires the PWM data control to switch between high and low levels once, which effectively reduces the frequency of switching between the high and low levels.

In the embodiment, by outputting the same PWM data control signal to the first light emitting diode and the second light emitting diode through the data line; the first light emitting diode is driven in the low level duration of the PWM data control signal; the second light emitting diode is driven in the high level duration of the PWM data control signal. Since the first light emitting diode is driven in the low level duration of the PWM data control signal, and the second light emitting diode is driven in the high level duration of the PWM data control signal, the light emitting diodes on two rows of the scanning lines can be lit when the PWM data control signal switches between high and low levels only once, so that the switching frequency between the high and low levels for controlling the light emitting diodes to turn on or off can be effectively reduced under high refresh rate conditions, and a large amount of additional power consumption caused by parasitic capacitance on the data line can be avoided.

The present application also provides a display device, which includes the display panel described in the above embodiment.

The display device provided by the present application adopts the display panel in the above embodiment, which can solve the technical problem in the related art that when the refresh rate is high, the frequency of switching between high and low levels of controlling the light emitting diode on or off of the light emitting diode will be higher, resulting in a large amount of additional power consumption caused by the parasitic capacitance on the data line. Compared with the related art, the beneficial effects of the display device provided by the present application are the same as the beneficial effects of the display panel provided by the above embodiment, which will not be repeated here.

The above descriptions are only some embodiments of the present application, and are not intended to limit the patent scope of the present application. All equivalent structural changes made using the contents of the specification and drawings under the technical concept of the present application, or direct/indirect applications in other related technical fields are included in the protection scope of the present application.

What is claimed is:

1. A display panel, comprising:
- a data line driver chip; and
- a plurality of pixel units;
- wherein each of the pixel units comprises: a first light emitting diode and a second light emitting diode;
- the data line driver chip is connected to a cathode of each of the first light emitting diodes and an anode of each of the second light emitting diodes through a data line;
- in a same pixel unit, an anode of the first light emitting diode is connected to odd-row scanning lines, the cathode of the first light emitting diode is connected to the anode of the second light emitting diode, and a cathode of the second light emitting diode is connected to even-row scanning lines;
- the data line driver chip is configured to output a same pulse width modulation (PWM) data control signal to the first light emitting diode and the second light emitting diode through the data line;
- the data line driver chip is further configured to drive the first light emitting diode in a low level duration of the PWM data control signal; and
- the data line driver chip is further configured to drive the second light emitting diode during a high level duration of the PWM data control signal.

2. The display panel according to claim 1, further comprising a scanning line driver chip, wherein:
- the scanning line driver chip is connected to the anode of each of the first light emitting diodes and the cathode of each of the second light emitting diodes through scanning lines;
- the scanning line driver chip is configured to output a first PWM scanning control signal to each of the first light emitting diodes through the scanning lines, and output a second PWM scanning control signal to each of the second light emitting diodes through the scanning lines;
- the data line driver chip is configured to drive the first light emitting diode based on the first PWM scanning control signal in the low level duration of the PWM data control signal; and
- the data line driver chip is further configured to drive the second light emitting diode based on the second PWM scanning control signal in the high level duration of the PWM data control signal.

3. The display panel according to claim 2, wherein the scanning line driver chip is connected to the anode of each of the first light emitting diodes through the odd-row scanning lines, and the scanning line driver chip is connected to the cathode of each of the second light emitting diodes through the even-row scanning lines;
- the scanning line driver chip is further configured to output the first PWM scanning control signal to the anode of each of the first light emitting diodes through the odd-row scanning lines; and
- the data line driver chip is further configured to drive the first light emitting diode when the first PWM scanning control signal is in a high level state in the low level duration of the PWM data control signal.

4. The display panel according to claim 3, wherein the data line driver chip is further configured to stop driving the first light emitting diode when the first PWM scanning control signal is in a low level state in the low level duration of the PWM data control signal.

5. The display panel according to claim 4, wherein the data line driver chip is further configured to control a gray scale of the first light emitting diode by adjusting a light emitting duration of the first light emitting diode; and
- the light emitting duration of the first light emitting diode is a time difference between a low-level ending moment of the PWM data control signal and a high-level starting moment of the first PWM scanning control signal.

6. The display panel according to claim 3, wherein the scanning line driver chip is further configured to output the second PWM scanning control signal to the cathode of each second light emitting diode through the even-row scanning lines; and
- the data line driver chip is further configured to drive the second light emitting diode when the second PWM scanning control signal is in a low level state in the high level duration of the PWM data control signal.

7. The display panel according to claim 6, wherein the data line driver chip is further configured to stop driving the second light emitting diode when the second PWM scanning control signal is in a high level state in the high level duration of the PWM data control signal.

8. The display panel according to claim 5, wherein the data line driver chip is further configured to control a gray scale of the second light emitting diode by adjusting a light emitting duration of the second light emitting diode; and
- the light emitting duration of the second light emitting diode is a time difference between a high-level ending moment of the PWM data control signal and a low-level starting moment of the second PWM scanning control signal.

9. A method for driving the display panel according to claim 1, comprising:
- outputting the same PWM data control signal to the first light emitting diode and the second light emitting diode through the data line;

in the low level duration of the PWM data control signal, driving the first light emitting diode; and in the high level duration of the PWM data control signal, driving the second light emitting diode.

10. A display device, comprising the display panel according to claim 1.

* * * * *